United States Patent [19]

Nguyen et al.

[11] Patent Number: 5,381,864

[45] Date of Patent: Jan. 17, 1995

[54] WELL TREATING METHODS USING PARTICULATE BLENDS

[75] Inventors: Philip D. Nguyen; Joe R. Murphey, both of Duncan; David L. Brown, Temple, all of Okla.

[73] Assignee: Halliburton Company, Duncan, Okla.

[21] Appl. No.: 151,337

[22] Filed: Nov. 12, 1993

[51] Int. Cl.$^6$ .......................................... E21B 43/267
[52] U.S. Cl. .................................. 166/280; 166/281; 166/308
[58] Field of Search ................ 166/280, 281, 295, 308

[56] References Cited

U.S. PATENT DOCUMENTS

| | | | |
|---|---|---|---|
| 3,075,581 | 1/1963 | Kern | 166/280 |
| 3,164,208 | 1/1965 | McGuire, Jr. et al. | 166/280 |
| 3,239,006 | 3/1966 | Fast | 166/280 |
| 3,245,470 | 4/1966 | Henry | 166/280 |
| 4,199,484 | 4/1980 | Murphey . | |
| 4,336,842 | 6/1982 | Graham et al. | 166/276 |
| 4,478,282 | 10/1984 | Nolte et al. | 166/280 |
| 4,490,047 | 12/1984 | Stegemoeller et al. | 366/132 |
| 4,518,039 | 5/1985 | Graham et al. | 166/280 X |
| 4,665,988 | 5/1987 | Murphey et al. | 166/295 |
| 4,802,141 | 1/1989 | Stegemoeller et al. | 366/132 |
| 4,919,540 | 4/1990 | Stegemoeller et al. | 366/132 |
| 4,969,523 | 11/1990 | Martin et al. | 166/50 |
| 5,083,614 | 1/1992 | Branch | 166/278 |
| 5,128,390 | 7/1992 | Murphey et al. | 523/130 |
| 5,131,472 | 7/1992 | Dees et al. | 166/308 |
| 5,271,465 | 12/1993 | Schmidt et al. | 166/308 X |

OTHER PUBLICATIONS

Darr, C. D. K., Brown, E. K., and Murphey, J. R., "A Method to Convert Multiple-Shot Section Openhole Completions Into Cased-Hole Completions With Zonal Isolation, Society of Petroleum Engineers," 1986, prepared for presentation at the Premian Basin Oil & Gas Recovery Conference of the Society of Petroleum Engineers held in Midland, Tex., Mar. 13–14, 1986.

Larsen, D. G. and Smith, L. J., "New Conductivity Found in Angular Blends of Fracturing Sand," Society of Petroleum Engineers, 1985, presented at the Society of Petroleum Engineers Production Operations Symposium held in Oklahoma City, Okla., Mar. 10–12, 1985.

Sales brochure entitled "Howard Smith Screen Company Technical Information Low-Profile Screen," Howard Smith Screen Company, publication date unknown.

Sales brochure entitled "Howard Smith Screen Company Technical Information Dual-Screen Prepack Screen," Howard Smith Screen Company, publication date unknown.

Sales brochure entitled "Howard Smith Screen Company Technical Information Flow Data for Dual Screen Low-Profile Prepack," Howard Smith Screen Company, publication date unknown.

Sales brochure entitled "Howard Smith Screen Company Technical Information Flow Data for Dual Screen Pipe-Base Prepack," Howard Smith Screen Company, publication date unknown.

Sales brochure entitled "Howard Smith Screen Company Technical Information Dimensions for Dual (List continued on next page.)

Primary Examiner—George A. Suchfield
Attorney, Agent, or Firm—Robert A. Kent; Dennis D. Brown

[57] ABSTRACT

Fracturing, frac-pack, and gravel packing procedures are provided which utilize a treating composition comprising a carrier fluid and a particulate blend. The particulate blend consists essentially of a large particulate material and a small particulate material. The large particulate material consists essentially of particles smaller than about 4 mesh but not smaller than about 40 mesh. The small particulate material consists essentially of particles smaller than about 16 mesh but not smaller than about 100 mesh. The small particulate material is present in the particulate blend in an amount in the range of from about 5% to about 60% by weight based on the amount of the large particulate material present in the particulate blend. A prepacked screening device including a large particulate/small particulate blend of the type just described is also provided.

19 Claims, 1 Drawing Sheet

OTHER PUBLICATIONS

Screen Low–Profile Prepack," Howard Smith Screen Company, publication date unknown.

Various sales brochures from Santrol entitled "Your First Choice: Santrol," High Strength Super HS®, Dual Coat Super DC ™, and Low Cost Super LC ™, publication dates unknown.

Sales brochure entitled "The Curable Proppant Designed for Frac Jobs—StrataFlex—System Stable ™ Coated Proppants," StrataProp, Inc., publication date unknown.

Sales brochure entitled "The Alternative to Frac Sand—Strata NB5—A Non–Bonding Resin Coated Sand," StrataProp, Inc., publication date unknown.

Buzarde, Jr., Kastor, Bell, and DePriester, "Lecture Notes for Production Operations Court I—Well Completions," Society of Petroleum Engineers of AIME, publication date unknown.

Sales brochure entitled "Excalibur Fracture Completion Service—Cut Loose the Trapped Potential of Your High Perm Reservoir," Halliburton Energy Services, publication date unknown.

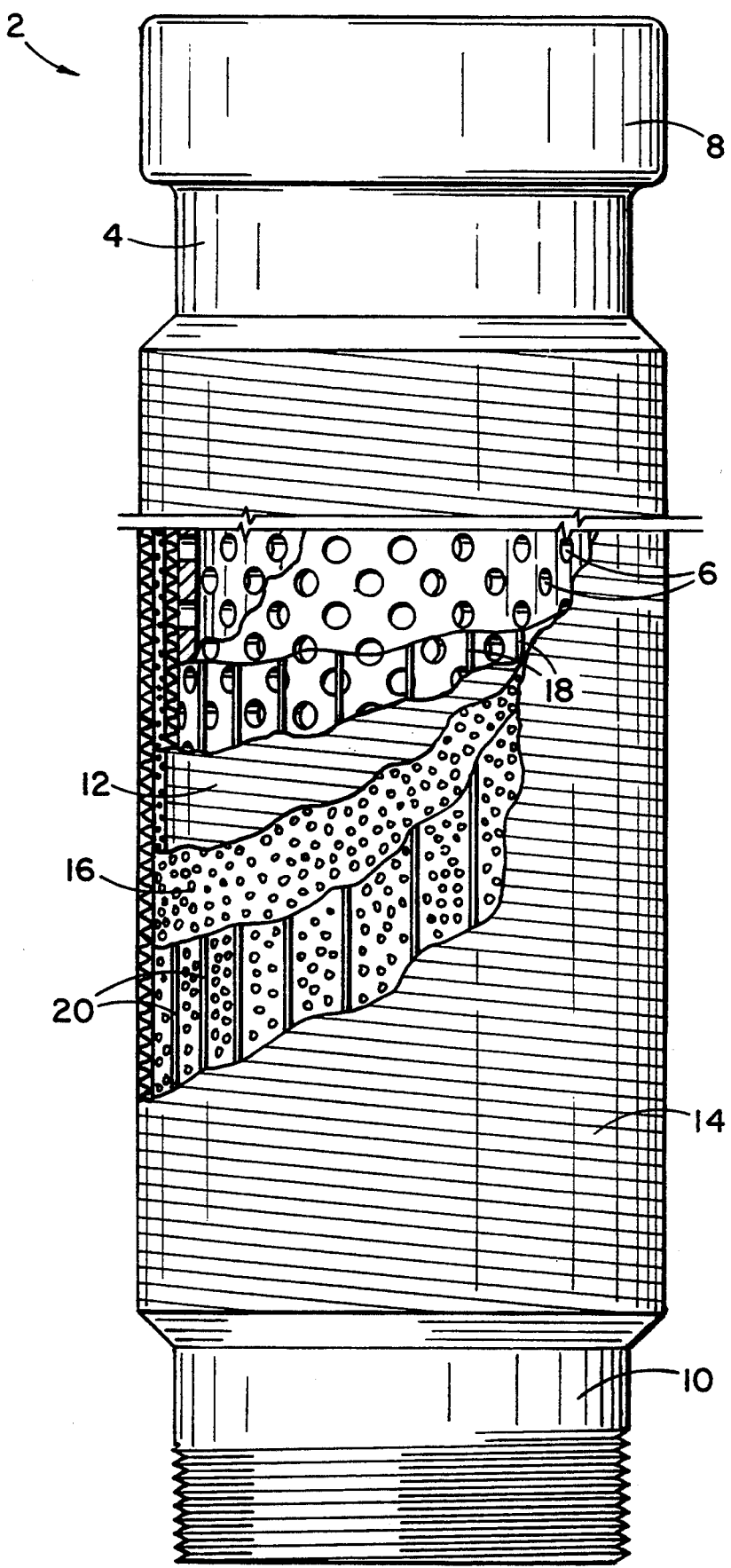

WELL TREATING METHODS USING PARTICULATE BLENDS

FIELD OF THE INVENTION

In one aspect, the present invention relates to fracturing, frac-pack, gravel packing, and similar methods for treating wells. In another aspect, the present invention relates to prepacked screening devices.

BACKGROUND OF THE INVENTION

When producing oil and/or gas from an unconsolidated subterranean formation, some type of particulate control procedure may be required in order to prevent sand grains and/or other formation fines from migrating into the wellbore and being produced from the well. The production of such particulate materials can reduce the rate of hydrocarbon production from the well and can cause serious damage to well tubulars and to well surface equipment.

Those skilled in the art have commonly used gravel packs to control particulate migration in producing formations. A gravel pack will typically consist of a mass of particulate material which is packed around the exterior of a screening device, said screening device being positioned in an open hole or inside a well casing. Examples of typical screening devices include wire-wrapped screens and slotted liners. The screening device will typically have very narrow slots or very small holes formed therein. These holes or slots are large enough to permit the flow of formation fluid into the screening device but are too small to allow the particulate packing material to pass therethrough. In conjunction with the operation of the holes or slots formed in the screening device, the particulate packing material operates to trap, and thus prevent the further migration of, formation sand and fines which would otherwise be produced along with the formation fluid.

Hydraulic fracturing techniques are commonly used to stimulate subterranean formations in order to enhance the production of fluids therefrom. In a conventional hydraulic fracturing procedure, a fracturing fluid is pumped down a wellbore and into a fluid-bearing formation. The fracturing fluid is pumped into the formation under a pressure sufficient to enlarge natural fissures in the formation and/or open up new fissures in the formation. Packers can be positioned in the wellbore as necessary to direct and confine the fracturing fluid to the portion of the well which is to be fractured. Typical fracturing pressures range from about 1,000 psi to about 15,000 psi depending upon the depth and the nature of the formation being fractured.

Fracturing fluids used in conventional hydraulic fracturing techniques include: fresh water; brine; liquid hydrocarbons (e.g., gasoline, kerosene, diesel, crude oil, and the like) which are viscous or have gelling agents incorporated therein; gelled water; and gelled brine. The fracturing fluid will also typically contain a particulate proppant material. The proppant flows into and remains in the fissures which are formed and/or enlarged during the fracturing operation. The proppant operates to prevent the fissures from closing and thus facilitates the flow of formation fluid through the fissures and into the wellbore.

Frac-pack operations are primarily used in highly unconsolidated and semi-consolidated formations to facilitate fluid recovery while preventing particulate migration. A frac-pack operation typically embodies the features of both a fracturing operation and a gravel packing operation. Preferably, the unconsolidated formation is initially fractured using a proppant-laden fracturing fluid. The proppant material deposits in the fractures which are formed during the fracturing operation. Due to the unconsolidated nature of the formation, the fractures produced during the fracturing step will typically be substantially wider and shorter than the fractures produced when fracturing consolidated formations. After a desired degree of fracturing is achieved, additional proppant material is tightly packed in the wellbore. The additional proppant material will typically be held in place in the wellbore by (a) packing the proppant material around a gravel packing screen and/or (b) consolidating the proppant material by means of a resin coating.

Examples of particulate materials commonly used for gravel packing and frac-pack operations and as fracturing proppants include: sand; glass beads; nut shells; metallic pellets or spheres; gravel; synthetic resin pellets or spheres; gilsonite; coke; sintered alumina; mullite; like materials; and combinations thereof.

Consolidatable resin-coated particulate materials have been used heretofore in various well treatment operations. Consolidatable resin-coated sands have been used, for example, for gravel packing, for frac-pack operations, and as proppant materials in formation fracturing operations. Due to their desirable permeability and compressive strength characteristics, resin-coated particulate materials are especially well-suited for treating semiconsolidated and unconsolidated formations which contain loose or unstable sands.

As used herein, the term "consolidatable resin-coated particulate material" refers to a particulate material (e.g., a proppant, a particulate gravel packing material, or a particulate material used for frac-pack operations) which is coated with a bonding-type resin composition (e.g., an epoxy resin composition, a phenol/aldehyde type resin composition, etc.). Typically, the consolidatable resin-coated composition particulate material will be injected into a subterranean zone using procedures whereby the resin does not substantially harden until after the particulate material has been delivered to a desired location within the formation. The hardening of the resin consolidates the particulate material to yield a hard, consolidated, permeable mass.

Well treatment methods utilizing consolidatable epoxy resin-coated particulate materials are disclosed, for example, in U.S. Pat. No. 5,128,390. Well treatment methods utilizing consolidatable resole-type phenolic resin-coated particulate materials are disclosed, for example, in U.S. Pat. No. 4,336,842. The entire disclosures of U.S. Pat. Nos. 4,336,842 and 5,128,390 are incorporated herein by reference.

U.S. Pat. No. 5,128,390 discloses a method for continuously forming and transporting consolidatable resin-coated particulate materials. In the method of U.S. Pat. No. 5,128,390, a particulate material (e.g., sand) and a hardenable epoxy resin system are continuously mixed with a stream of gelled carrier liquid. The resulting continuous composition is delivered to and/or injected into a desired subterranean zone. As the continuous mixture flows down the well tubing toward the subterranean zone, the composition ingredients are mixed such that the gel-suspended particulate material is thoroughly coated with the hardenable epoxy resin system. After being placed in the subterranean zone, the epoxy resin composition is allowed to harden whereby the resin-coated particulate material forms a hard, permeable, consolidated mass.

The hardenable epoxy resin composition used in the method of U.S. Pat. No. 5,128,390 is generally composed of: a polyepoxide resin carried in a solvent system; a hardening agent; a coupling agent; and a hardening rate controller.

U.S. Pat. No. 4,336,842 disclosed methods for treating wells using resin-coated particles. As indicated above, the methods of U.S. Pat. No. 4,336,842 preferably utilize one-step phenolic resins which are prepared by reacting phenolic compounds with aldehydes in the presence of alkaline catalysts. Such resins are commercially available in both powder and liquid form. Examples of suitable phenolic compounds include: phenol; resorcinol; alkyl substituted phenols (e.g., cresol and p-tert-butyl phenol) and cardanol. Examples of suitable aldehyde compounds include: formaldehyde; acetaldehyde; and furfuraldehyde. The specific resin-coated particulate materials disclosed in U.S. Pat. No. 4,336,842 are free-flowing, pre-coated particulate materials. Such pre-coated particulate materials can be prepared, for example, by (a) dissolving the powdered phenolic resin in a solvent, mixing the particulate material with the resulting resin solution, and then evaporating the solvent or (b) using a heat coating process wherein the particulate substrate material is heated and then mixed with the powdered resin.

In one embodiment of the methods of U.S. Pat. No. 4,336,842, a pre-coated particulate material of the type just described is used in a formation fracturing operation. The formation fracturing operation includes the steps of: generating a fracture in the formation by pumping a viscous fluid into the formation at a pressure and at a rate sufficient to fracture the formation; continuing the viscous fluid pumping step until a desired fracture geometry is obtained; mixing the pre-coated particulate material with a carrier fluid; pumping the carrier/particulate mixture into the formation such that the pre-coated particulate material deposits in and fills the fracture; pumping a curing solution into the formation such that the curing solution contacts the pre-coated particulate material; and then allowing the resin coating to fuse and cure at the elevated temperature conditions existing in the formation. Upon curing, the resin coated particulate material forms a hard, permeable mass. The curing solution used in U.S. Pat. No. 4,336,842 includes a resin softening agent capable of lowering the fusion temperature of the resin coating. Examples of suitable softening agents include: alcohols which are at least partially soluble in the resin; nonionic surfactants; and combinations thereof.

In other embodiments of the methods of U.S. Pat. No. 4,336,842, pre-coated particulate materials of the type described above are used in conventional gravel packing operations. Examples include open-hole gravel packs, inside-the-casing gravel packs, and linerless gravel packs. After the gravel pack is in place, a curing solution of the type described above is pumped into the formation such that the solution contacts the pre-coated particulate material. The well is then shut-in in order to allow the resin coating to fuse and cure at the elevated temperature conditions existing in the formation.

Heretofore, in conducting a fracturing, gravel packing, frac-pack, or similar well treating operation, the particulate material used has typically consisted of particles lying within a single, relatively narrow size range (e.g., 20/40 mesh, 40/60 mesh, or 50/70 mesh). As used herein and in the claims, a term such as "20/40 mesh" refers to a material having a particle size distribution lying entirely within the range of from 20 to 40 mesh, U.S. sieve series. Thus, the particles of a 20/40 mesh material would be smaller than 20 mesh, U.S. sieve series, but not smaller than 40 mesh, U.S. sieve series.

The specific particle size selected for use in a given application has primarily depended upon (a) the degree of unconsolidation existing in the formation (i.e., the degree to which the formation contains loose sand and fine materials which would otherwise migrate through the formation and into the well tubing), (b) the particle size distribution of the natural sand and fine materials comprising the formation, and (c) the desired product flow rate to be obtained from the formation.

Heretofore, the selection of an appropriately sized particulate material for treating an unconsolidated or semi-consolidated formation has involved an undesirable trade-off. The use of a large particulate material (e.g., 12/20 mesh or 20/40 mesh) provides a high initial permeability and a correspondingly high initial production rate. However, the migration of formation sand and fines into the large material eventually clogs fluid passageways within the material bed and thereby reduces the production rate sustainable through the bed. Additionally, the eventual migration of formation sand and fines through the bed and into the wellbore can cause severe damage to the well tubulars and other production equipment. The use of a small particulate material (e.g., 40/60 mesh, 50/70 mesh, or 60/80 mesh), on the other hand, substantially prevents the migration of formation sand and fines into and through the particulate bed. However, small particulate materials have relatively low permeabilities and therefore yield substantially reduced production rates.

The most commonly used gravel packing material is believed to be 20/40 mesh resieved sand.

Thus, a need presently exists for fracturing, frac-pack, gravel packing, and similar treating techniques wherein the particulate materials used will both (a) prevent the migration of formation sand and fines and (b) provide high relative production rates.

U.S. Pat. No. 4,478,282 discloses a hydraulic fracturing technique wherein adverse vertical height growth of induced fractures is controlled by the injection of a non-proppant fluid stage. The non-proppant fluid stage comprises a transport fluid and a flow blocking material. The flow blocking material has a particle size distribution which is sufficient to form a substantially impermeable barrier to vertical fluid flow. The method of U.S. Pat. No. 4,478,282 includes the steps of (a) injecting a fracturing fluid pad into the formation at a sufficient rate and pressure to open a fracture in the formation, then (b) injecting the non-proppant fluid stage into the formation, and then (c) injecting a proppant-laden slurry into the formation.

The particulate material used in the non-proppant fluid stage of the method of U.S. Pat. No. 4,478,282 consists of a large particulate material (i.e., 10/20 mesh and/or 20/40 mesh) and a very small particulate material (i.e., smaller than 100 mesh). The large particulate material creates particle bridges within the formation fracture. The very small particulate material, on the other hand, fills the gaps existing between the larger particles and forms a substantially impermeable barrier to fluid flow.

Thus, the method of U.S. Pat. No. 4,478,282 neither addresses nor resolves the particulate migration and production rate problems discussed above. Rather, as will be apparent, U.S. Pat. No. 4,478,282 teaches away from the invention described and claimed herein below.

U.S. Pat. No. 4,665,988 discloses a method of filling a void in a subterranean formation. The method includes the steps of: (a) admixing a first particulate material, a second particulate material, and a resin composition with a viscous carrier fluid; (b) introducing the resulting mixture into the subterranean formation such that the void is filled by the mixture; (c) compacting the particulate material in the void by applying fluid pressure to the mixture; and (d) allowing the resin composition to harden such that the particulate materials are consolidated and a permeable mass is formed within the void. The first particulate material used in the fill composition has a particle size of no greater than 10 mesh. The second particulate material used in the fill composition has a median diameter of less than 1/7 the median diameter of the first particulate material. After the resin composition hardens, any excess fill material remaining in the wellbore can be drilled out and a suitable liner is then installed in the wellbore and cemented in place to thereby isolate a selected zone of interest.

Thus, U.S. Pat. No. 4,665,988 neither discloses nor suggests a means by which fracturing, gravel packing, frac-pack, and similar techniques can be improved to (a) provide high fluid production rates while (b) preventing the migration of formation particulates into the wellbore. Rather, U.S. Pat. No. 4,665,988 discloses only a secondary or tertiary production technique wherein existing formation voids adjacent a wellbore are filled with a permeable mass prior to inserting a new casing into the wellbore and cementing the casing in place.

U.S. Pat. No. 4,969,523 purports to provide a gravel packing method wherein equivalent packing efficiency is obtained in the upper and lower perforations and portions of the wellbore annulus. The method comprises injecting a particulate/carrier fluid slurry into the wellbore wherein the particulate material includes first particles having a density less than the density of the carrier fluid and second particles having a density greater than that of the carrier fluid. U.S. Pat. No. 4,969,523 also discloses the performance of a comparative test which utilized a mixture of 20/40 mesh sand having a density of 2.65 and 18 to 50 mesh styrenedivinylbenzene beads having a density of 1.05. Thus, U.S. Pat. No. 4,969,523 neither addresses nor resolves the specific particulate migration and production rate problems discussed above.

SUMMARY OF THE INVENTION

The inventive methods described herein utilize a treating composition comprising a carrier fluid and a particulate blend. The particulate blend consists essentially of a large particulate material and a small particulate material. The large particulate material consists essentially of particles smaller than about 4 mesh, but not smaller than about 40 mesh. The small particulate material consists essentially of particles smaller than about 16 mesh, but not smaller than about 100 mesh. Substantially all of the particles of the small particulate material are smaller than substantially all of the particles of the large particulate material. The small particulate material is present in the particulate blend in an amount in the range from about 5% to about 60% by weight based on the amount of large particulate material present in the particulate blend. The particulate blend is a particulate blend which has been formed by admixing one of the particulate materials with the other of the particulate materials.

In one embodiment of the inventive method, a subterranean formation is stimulated by injecting a treating composition of the type described hereinabove into the subterranean formation. The treating composition is injected into the subterranean formation such that the treating composition forms a fracture in the subterranean formation and the particulate blend is deposited in the fracture to thus provide a fluid permeable region within the subterranean formation.

A second embodiment of the inventive method pertains to a gravel packing procedure comprising steps of: (a) placing a screening device in a wellbore and then (b) injecting a treating composition of the type described hereinabove into the wellbore. The treating composition is injected into the wellbore in step (b) such that the particulate blend contained in the treated composition is packed around the exterior of the screening device. The packed particulate blend provides a fluid-permeable barrier around the screening device which is operable for preventing the migration of formation particulates into the screening device.

Another embodiment of the inventive method pertains to a procedure for producing a formation fluid from a subterranean formation, said subterranean formation having a portion of a wellbore extending thereinto. This embodiment of the inventive method comprises the steps of: (a) placing a treating composition of the type described hereinabove into said portion of the wellbore such that the particulate blend is packed in the wellbore to provide a fluid-permeable barrier which is operable for preventing the migration of formation particulates and (b) producing formation fluid through the packed particulate bed formed in step (a) without further modifying the packed particulate bed.

Another embodiment of the inventive method pertains to a procedure for stimulating a subterranean formation. This embodiment of the inventive method comprises the steps of: (a) applying a first fluid to the formation such that a fracture is formed therein and (b) injecting a treating composition of the type described herein above into the fracture. The treating composition is injected into the fracture in step (b) such that particulate blend is deposited in the fracture to thus provide a fluid-permeable region within the subterranean formation.

In yet another embodiment, the present invention provides a prepacked screening device. The screening device comprises: a conduit including a conduit wall and having apertures extending through the conduit wall; a fluid-permeable screen positioned exterior to the conduit and spaced apart from the conduit; and a fluid-permeable particulate bed positioned between the fluid-permeable screen and the conduit. The particulate bed comprises a particulate blend formed by mixing a large particulate material with a small particulate material. The large particulate material consists essentially of particles smaller than about 4 mesh but not smaller than about 40 mesh. The small particulate material consists essentially of particles smaller than about 16 mesh but not smaller than about 100 mesh. Substantially all of the particles of the small particulate material, however, are smaller than substantially all of the particulates of the large particulate material. The small particulate material is present in the particulate bed in an amount in the range of from about 5% to about 60% by weight based on the amount of the large particulate material present in the particulate bed.

The present invention resolves the problems and satisfies the needs discussed hereinabove which have been encountered in the use of prior art fracturing, frac-pack, and gravel packing techniques. The particulate systems utilized in the present invention provide permeability levels and production rates substantially superior to those provided by the single-sized small particulate systems used heretofore. Yet, at the same time, the particulate systems used in the present invention provide formation sand and formation fines control levels which are substantially equivalent to the control levels provided by single-sized small particulate systems.

Further objects, features, and advantages of the present invention will be readily apparent to those skilled in the art upon reference to the accompanying drawing and upon reading the following description of the preferred embodiments.

BRIEF DESCRIPTION OF THE DRAWING

The drawing provides a partially cutaway elevational view of a prepacked screening device provided by the present invention.

DESCRIPTION OF THE PREFERRED EMBODIMENTS

The treating composition used in the methods of the present invention comprises a mixture including both a carrier fluid and a particulate blend. The particulate blend is preferably suspended in the carrier fluid. The particulate blend comprises a large particulate material and a small particulate material. The composition can also include a hardenable resin system which will consolidate the particulate blend to form a hard permeable mass. If a hardenable resin system is employed in the treating composition, the resin system can be (a) added to the treating composition at the well site, (b) included as a precoating on the individual particles of the particulate blend, or (c) added to the treating composition using generally any other means commonly employed in the art.

The particulate materials used in the treating composition can generally be any of the particulate materials commonly used in fracturing, frac-pack, gravel packing, and similar procedures. Examples of such materials are listed hereinabove. Preferably, both the large particulate material and the small particulate material used in the treating composition are sand.

The large particulate material preferably consists essentially of particles smaller than about 4 mesh but not smaller than about 40 mesh. More preferably, the large particulate material is either a 4/8 mesh material, an 8/12 mesh material or a 12/20 mesh material. The large particulate material most preferably has a particle size distribution of 4/8 mesh or 8/12 mesh.

The small particulate material preferably consists essentially of particles smaller than about 16 mesh but not smaller than about 100 mesh. More preferably, the small particulate material is a 20/40 mesh material, a 40/60 mesh material, a 50/70 mesh material, a 60/80 mesh material, or an 80/100 mesh material. The small particulate material most preferably has a particle size distribution of either 20/40 mesh or 40/60 mesh.

The particle size distributions of the small and large particulate materials should be such that substantially all of the particles of the small material are smaller than substantially all of the particles of the large material. Examples of particularly desirable large and small particulate combinations include (a) a 4/8 mesh material blended with either a 16/30 mesh material or a 20/40 mesh material; (b) a 8/12 mesh material blended with either a 30/50 mesh material or a 40/60 mesh material; (c) a 12/20 mesh material blended with either a 50/70 mesh material or a 40/60 mesh material; and (d) a 20/40 mesh material blended with either a 50/70 mesh material or a 60/80 mesh material.

Particulate blends which are particularly well-suited for use in the present invention will consist essentially of (a) a small particulate material of the type just described having a median particle diameter which is from about four to about seven times the median diameter of the particulate materials making up the subterranean zone being treated and (b) a large particulate material of the type just described having a median particle diameter which is from about six to about eleven times the median particle diameter of the small particulate material. Such particulate blends provide high permeabilities and excellent sand control properties.

The small particulate material is preferably present in the particulate blend in an amount in the range of from about 5% to about 60% by weight based on the amount of large particulate material present in the blend, and more preferably 15 to 40%. Most preferably, the small particulate material is present in the particulate blend in an amount in the range of from about 20% to about 35% by weight based on the amount of large particulate material present in the blend.

It is preferred that the bulk volume of small particulate material used in the particulate blend not substantially exceed the bulk void volume of the large particulate material. 12/20 mesh resieved Ottawa sand, for example, has a bulk void volume in the range of from about 34% to about 36% of the total volume of the bulk material. 20/40 mesh resieved Ottawa sand, on the other hand, has a bulk void volume in the range of from about 33% to about 35% of the total volume of the bulk material. Significant permeability improvements are realized when the amount of small particulate material contained in the particulate blend is low enough to ensure that substantially all of the small particulate material can be contained within the bulk void spaces existing between the larger particles.

The carrier fluid used in forming the treating composition can generally be any type of carrier fluid which is used in fracturing, frac-pack, gravel packing, or other similar procedures. Examples include: fresh water; brine; liquid hydrocarbons (e.g., gasoline, kerosene, diesel, crude oil, and the like) which are viscous and/or have viscosifiers or gelling agents incorporated therein; gelled water; and gelled brine. The carrier fluid is preferably a gelled aqueous composition formed from water, brine, or a similar aqueous fluid. The aqueous fluid is preferably a brine solution produced by the addition of sodium chloride, potassium chloride, ammonium chloride, calcium chloride, or the like to fresh water. Most preferably, the aqueous fluid is a brine solution comprising water and an amount of potassium chloride or ammonium chloride in the range of from about 2% to about 3% by weight based on the total weight of the brine solution.

Gelled carrier fluid systems, additives, and concentrations suitable for use in the present invention are disclosed, for example, in U.S. Pat. Nos. 4,199,484, 4,665,988 and 5,128,390. The entire disclosures of these patents are incorporated herein by reference.

Gelled aqueous carrier fluids utilized in the present invention can be formed using generally any of the gelling agents employed heretofore in well treating operations. Gelling agents preferred for use in the present invention are polysaccharides having molecular weights in the range of from about 100,000 to about 4,000,000. Polysaccharides having molecular weights in the range of from about 600,000 to about 2,400,000 are particularly well-suited for use in the present invention. Examples of polysaccharide polymers preferred for use in the treating composition include: substituted carboxy and hydroxy alkyl cellulose (e.g., hydroxyethyl cellulose and carboxymethyl hydroxyethyl cellulose); guar gum; guar gum derivatives (e.g., hydroxypropyl guar); and xanthan gum. The gelling agent most preferably used in the treating composition is hydroxyethyl cellulose.

The gelled aqueous carrier liquid can also include one or more gel cross-linking agents. Examples of gel cross-linking agents preferred for use in the present invention include: borate salts which will provide borate ions at a pH in the range of from about 8.5 to about 12; chromium-containing compounds; lactate; titanium triethanolamine; other titanium-containing compounds; aluminum acetate; magnesium oxide; and zirconium salts.

The gelled aqueous carrier fluid will preferably contain a sufficient amount of polymer or a sufficient amount of polymer and cross-linker to yield a gelled carrier fluid viscosity in the range of from about 10 to about 800 centipoise. Assuming that the gelling agent used is hydroxyethyl cellulose and that a cross-linking agent is not used, from about 20 to about 100 pounds of gelling agent per 1000 gallons of aqueous fluid will typically be required to achieve a gelled system viscosity in the range of from about 10 to about 800 centipoise at a shear rate of 511 $sec^{-1}$.

When a cross-linking agent is used, the amount of organic gelling agent required to achieve a given gelled system viscosity can be reduced by approximately one-half. As is well known in the art, the amount of cross-linking agent required to achieve a given gel viscosity will (a) vary depending on the specific gelling and cross-linking agents used and (b) be proportional to the amount of gelling agent used.

When a noncross-linked gelled aqueous carrier fluid is used, the tendency of the particulate blend to settle out of the particulate blend/carrier fluid mixture increases as the amount of visible clear fluid in the particulate blend/carrier fluid mixture increases (i.e., as the relative amount of particulate blend in the mixture decreases). Consequently, the amount of particulate blend used in the mixture is most preferably an amount which is suitable for pumping downhole but which also minimizes the amount of visible clear fluid in the particulate blend/carrier fluid mixture.

Due to the settling phenomenon associated with the use of a noncross-linked gelled aqueous carrier fluid, the amount of particulate blend added to a noncross-linked gelled carrier fluid will preferably be an amount in the range of about 1 pound to about 30 pounds, preferable from about 5 pounds to about 20 pounds, of particulate blend per gallon of gelled aqueous carrier fluid.

When a cross-linked gelled aqueous carrier liquid is used, the amount of particulate blend added to the carrier liquid will preferably be an amount of at least about 1 pound, and most preferably from about 5 pounds to about 30 pounds, of particulate blend per gallon of gelled carrier fluid. In contrast to noncross-linked carrier fluids, the ability of a cross-linked carrier fluid to hold the particulate blend in suspension does not appear to be substantially affected by particulate blend concentration.

The treating composition used in the inventive methods also preferably includes one or more gel breakers. Gel breaker systems and gel breaker concentrations suitable for use in the present invention are discussed, for example, in U.S. Pat. Nos. 4,199,484, 4,665,988 and 5,128,390. The gel breakers preferred for use in the treating composition are materials which, at a time substantially corresponding to the placement of the treating composition in a desired subterranean zone, will operate to break the carrier gel and thereby reduce the viscosity of the carrier liquid. When the carrier liquid gel is broken, the carrier liquid readily separates from the particulate blend. Following separation, the particulate blend provides a permeable mass which facilitates the flow of formation fluids but prevents the migration of formation sand and fines into the wellbore.

Examples of gel breakers suitable for use in the present invention include: enzyme-type gel breakers such as cellulase and hemicellulase; low molecular weight peroxides and hydroperoxide compounds (e.g., tert-butylhydroperoxide and alkyl peroxides containing from 2 to about 18 carbon atoms); perborates; potassium salts; ammonium salts; lithium salts; inorganic acids (e.g., hydrochloric acid); and organic acids (e.g., formic acid and acetic acid). When an acid-type gel breaker is used, the gel breaker can optionally be separately injected downhole in aqueous solution form following the injection of the particulate/gelled carrier fluid blend.

As indicated above, the treating composition used in the inventive methods can optionally include a hardenable resin system. Generally, any epoxy resin system, phenolic/aldehyde resin system, or other bonding resin system used in the art for consolidating particulates to form permeable beds or flow paths can be used in the present invention. When used, the hardenable resin system will be included in the treating composition in an effective amount for consolidating the particulate blend to form a hard permeable mass within the subterranean zone being treated. Hardenable resin systems, resin system components, and resin system component concentrations suitable for use in the present invention are disclosed, for example, in U.S. Pat. Nos. 4,199,484, 4,336,842, 4,665,988 and 5,128,390.

The hardenable resin system used in the present invention will preferably comprise one or more epoxy resins and one or more hardening agents. Other ingredients typically employed in such epoxy resin systems include: solvents, coupling agents, surfactants, and hardening rate controllers.

Examples of epoxy resins preferred for use in the present invention include: diglycidyl ethers of bisphenol-A; diglycidyl ethers of bisphenol-F; glycidyl ethers of aminophenols; glycidyl ethers of methylenedianiline; and epoxy novolac resins. The epoxy resins used in the present invention will preferably have epoxide equivalent weights (EEW) in the range of from about 90 to about 300. The EEW of an epoxy resin is determined by dividing the molecular weight of the epoxy resin by the number of epoxide groups contained in the epoxy resin molecule.

Examples of hardening agents suitable for use in the resin system include amines, polyamines, amides, and polyamides. A preferred hardening agent comprises methylenedianiline which is dissolved in a solvent such as ethylacetate or is dissolved in a liquid eutectic mixture of amines diluted with methyl alcohol.

Typically, the amount of hardening agent used in the resin system will be an amount in the range of from about 2 to about 150 parts by weight per 100 parts by weight of polyepoxide resin. When the hardening agent employed is an aromatic amine, the amount of hardening agent used in the resin system will typically be an amount in the range of from about 8 to about 50 parts by weight per 100 parts by weight of polyepoxide resin. When the hardening agent used is methylenedianiline, the hardening agent will typically be included in the resin system in an amount in the range of from about 25 to about 38 parts by weight per 100 parts by weight of epoxide resin.

The resin system can optionally include a solvent or solvent system. When used, the solvent or solvent system will preferably be included in an amount sufficient to ensure that the viscosity of the resin system does not substantially exceed about 800 centipoise at 70° F. Examples of solvents suitable for use in the resin system include: polar organic diluents which are reactive with epoxide and polyepoxide resins; polar organic diluents which are substantially nonreactive with epoxy resins; commonly used aromatic solvents; and mixtures thereof. Examples of suitable reactive polar organic solvents include: butylglycidyl ether; creosolglycidyl ether; alkylglycidyl ether; phenolglycidyl ether; and generally any other glycidyl ether which is miscible with the epoxy resin(s) used. Examples of substantially nonreactive polar organic solvents suitable for use in the resin system are described, for example, in U.S. Pat. No. 5,128,390. Preferred nonreactive polar organic solvents include ethylacetate, butyllactate, ethyllactate, amylacetate, ethyleneglycoldiacetate, and propyleneglycoldiacetate.

As indicated above, the hardenable resin system, when used, will be included in the treating composition in an effective amount for consolidating the particulate blend to form a hard permeable mass. Typically, the amount of epoxy resin system used in the treating composition will be an amount providing in the range of from about 0.1 to about 20 pounds of epoxy resin per 100 pounds of particulate material. When the epoxy resin used in the hardenable resin system is a diglycidyl ether of bisphenol-A (e.g., "EPON 828", available from Shell Chemical Company), the amount of hardenable resin system used in the treating composition will preferably be an amount providing in the range of from about 0.5 to about 15 pounds of epoxy resin per 100 pounds of the particulate material.

The epoxy resin system can also optionally include one or more cross-linking agents which promote the cross-linking of the epoxy resin system. Examples of suitable cross-linking agents include: methylene dianiline and isomers thereof; amine adducts of "EPON 828"; and amine adducts of other glycidol ether compounds. As will be understood by those skilled in the art, the use of such cross-linking agents, where possible, can provide an economically desirable means of reducing the amount of epoxy resin required for a given application.

One or more coupling agents will preferably be included in the hardenable resin system in order to facilitate the coupling of the epoxy resin(s) with the particulate components of the treating composition. Coupling agents preferred for use in the resin system are functional silanes (e.g., N-beta-(aminoethyl)-gamma-aminopropyltrimethoxysilane). The amount of coupling agent used in the treating composition will preferably be an amount in the range of from about 0 to about 3 parts by weight per 100 parts by weight of epoxy resin.

As will be understood by those skilled in the art, hardening rate controllers (i.e., retarders or accelerators) can be used to extend or shorten the time necessary for curing the epoxy resin system. Examples of suitable retarders include low molecular weight organic acid esters (e.g., alkyl esters of low molecular weight alkyl acids containing from about 2 to about 3 carbon atoms). Examples of suitable accelerators include: 2,4,6-trisdimethylaminomethylphenol; the ethylhexonate salt of 2,4,6-trisdimethylaminomethylphenol; and weak organic acids such as fumeric acid, erythorbic acid, ascorbic acid, and maleic acid. Any hardening rate controller used in the hardenable resin composition will typically be present in an amount in the range of from about 0 to about 10 parts by weight per 100 parts by weight of the epoxy resin(s) used in the system.

The hardenable resin system will preferably also include one or more surfactants which will improve the wettability of the particulate materials used in the treating composition and will thereby enable the hardenable resin system to rapidly coat the particulate materials. Examples of surfactants suitable for use in the present invention, as well as desirable concentrations thereof, are disclosed in U.S. Pat. Nos. 4,199,484, 4,665,988 and 5,128,390.

In order to further facilitate the coating of the particulate material, the treating composition can optionally include an aliphatic alcohol which is only slightly water-soluble. Examples of preferred aliphatic alcohols include isoamyl alcohol and isohexyl alcohol. When used, such alcohols are typically present in the resin system in an amount in the range of from about 1 to about 2.5 gallons per 1000 gallons of gelled aqueous carrier liquid.

As will be understood by those skilled in the art, the hardenable resin system can further include various other components (e.g., foaming agents, oil-water demulsifiers, etc.) which are commonly used in fracturing, gravel packing, and frac-pack compositions.

The components of the treating composition can be blended together using generally any procedure which is commonly used for preparing fracturing, frac-pack, and gravel packing compositions. The treating composition is preferably prepared by first mixing the gelling agent with brine or some other aqueous fluid to form the gelled aqueous carrier liquid. The gelled aqueous carrier liquid will typically then be conducted to a mixing apparatus such as a continuous stream tub mixer. Examples of continuous tub mixers used in the art are disclosed, for example, in U.S. Pat. Nos. 4,490,047, 4,802,141, and 4,919,540. The entire disclosures of U.S. Pat. Nos. 4,490,047, 4,802,141, and 4,919,540 are incorporated herein by reference. In the tub mixer, the other components of the inventive composition will preferably be continuously added to and mixed with the gelled aqueous carrier fluid. As the components are mixed, the resulting mixture is continuously drawn from the mixer. The continuous mixture is injected into the well such that the mixture is directed to a desired subterranean zone.

If the treating composition includes (a) a particulate blend which has not been precoated with a resin composition and (b) a hardenable resin system, the treating composition undergoes additional blending as it flows down the well tubing toward the subterranean zone such that: (1) the particulate blend is thoroughly mixed with the gelled aqueous carrier liquid; (2) the components of the hardenable resin system are thoroughly mixed; and (3) the particulate blend is thoroughly coated with the hardenable resin system.

When a cross-linked gelled aqueous carrier fluid is used, the gel cross-linking agent is preferably added to the composition after (a) the gelling agent is mixed with the aqueous liquid to form a noncross-linked aqueous gel and (b) the particulate blend is mixed with the non-cross-linked carrier. This delayed addition of the gel cross-linking agent can be accomplished at the well site by injecting the gel cross-linking agent at a point downstream of the mixing tub.

In one embodiment of the present invention, a treating composition of the type described hereinabove is used to fracture a subterranean formation. The inventive fracturing method can be conducted in generally the same manner as a conventional hydraulic fracturing procedure. The treating composition is pumped into the formation under a pressure sufficient to enlarge natural fractures in the formation and/or open up new fractures in the formation. As the treating composition is pumped into the formation, the proppant blend contained in the treating composition remains in the fractures which are formed and/or enlarged during the fracturing operation. The deposited proppant blend operates to (a) prevent the formation fractures from closing, (b) provide a high permeability flow path to the wellbore and (c) prevent the migration of formation sand and fines through the formation fractures.

If the treating composition used in the inventive fracturing method includes a bonding resin system, the resin system is allowed to harden after the proppant blend is placed in the formation fractures. During the resin hardening process, a sufficient amount of fluid pressure is preferably maintained on the resin-coated particulate blend to ensure that substantially all of the coated proppant material remains in the formation fractures. The hardened resin composition operates to consolidate the proppant materials in the formation fractures to thereby provide high permeability flow paths within the formation which resist particulate migration.

In an alternative embodiment of the inventive fracturing method, the above-described treating composition is used in a fracturing procedure of the type described in U.S. Pat. No. 4,336,842. As indicated above, this fracturing procedure comprises the steps of: fracturing a formation by pumping a viscous liquid of the type described in U.S. Pat. No. 4,336,842 into the formation at a pressure and rate sufficient to fracture the formation; continuing to pump the viscous fracturing fluid into the formation until a desired fracture geometry is obtained; pumping a treating composition of the type described hereinabove into the resulting fracture(s) such that the particulate blend deposits in and fills the fracture(s); and, assuming that the treating composition includes some type of bonding resin system, allowing the resin composition to harden.

In yet another embodiment of the inventive fracturing method, the above-described treating composition is used in a fracturing procedure of the type described in U.S. Pat. No. 5,131,472, issued to Dees et al. The entire disclosure of U.S. Pat. No. 5,131,472 is incorporated herein by reference. In this embodiment of the inventive method, one or more fractures are formed in a formation by suddenly applying a fluid pressure to the formation (preferably by means of a compressible fluid or a compressible/non-compressible fluid combination) which exceeds the formation fracturing pressure. Then, before the fluid pressure being applied to the formation declines to a point such that the formation fracture(s) is/are allowed to close, a treating composition of the type described hereinabove is pumped into the formation fracture(s). In pumping the treating composition into the formation fractures, the treating composition will preferably have been mixed with a gas. The amount of treating composition contained in the treating composition/gas mixture will preferably be an amount in the range of from about 5 to about 95 volume %, based on the total volume of the treating composition/gas mixture at surface pumping pressure conditions.

In one form of the inventive Dees et al. type method, a formation having a casing extending thereinto is fractured by perforating the casing at a time when the portion of the casing being perforated is filled with a high-pressure fluid. A treating composition/gas mixture is then pumped into the well immediately after the operation of the perforating apparatus. Examples of perforating devices suitable for use in this method include wire-line-conveyed perforating guns, perforating guns activated by drop bars, pressure activated perforating guns, and other such devices.

In another form of the inventive Dees et al. type method, a well having previously formed casing perforations is treated by: (a) positioning a tubing string in the well casing, said tubing string including means for releasing a fluid pressure in the tubing string; (b) filling the tubing string with high pressure fluid; (c) suddenly releasing the high pressure fluid into the portion of the casing which includes the previously formed perforations such that the high pressure fluid flows through the perforations and thereby fractures the formation; and (d) pumping a treating composition/gas mixture into the formation fractures.

The sudden application of a high pressure fluid to a subterranean formation in accordance with the Dees et al. type methods is believed to cause the opening of fractures in multiple formation planes. Additionally, the fact that the high pressure fluid is present at each casing perforation helps to ensure that the high pressure fluid will enter and fracture substantially all of the perforations. Further, the injection of the treating composition/gas mixture at a time before the formation fractures have had a chance to close desirably increases the size of the formation fractures.

In another embodiment of the present invention, a treating composition of the type described hereinabove is used for gravel packing a wellbore. The inventive gravel packing method is conducted in substantially the same manner as conventional gravel packing procedures which use standard gravel packing materials. In the inventive gravel packing method, a screening device is positioned in an open hole or inside a well casing. If placed in an open hole, the portion of the wellbore which is to be packed will preferably be underreamed prior to placing the liner therein. After placing the liner in the wellbore, the treating composition is preferably pumped down a tubing string positioned inside the screening device, out the distal end of the screening device, and into the annulus existing between the screening device and the bore wall or well casing. As a result, the particulate blend deposits in and is packed in the annulus. The treating composition carrier fluid, on the other hand, separates from the particulate blend, flows through the fluid openings in the screening device, and flows out of the well via the annulus existing between the treating composition tubing string and the interior wall of the liner.

If the treating composition includes a hardenable resin composition, the hardenable resin composition is allowed to harden after the particulate blend has been packed around the screening device. Upon hardening, the resin system consolidates the particulate blend to form a hard permeable mass around the screening device. The inventive gravel packing method provides a gravel pack which is highly permeable and which operates to prevent the migration of formation sand and fines into the screening device.

In an alternative embodiment of the inventive gravel packing method, a treating composition of the type described hereinabove is used to pack an open or cased portion of a wellbore. In this embodiment, a screening device is not used. Rather, the treating composition is preferable pumped into the wellbore such that (a) the particulate blend portion of the treating composition fills the portion of the wellbore which is to be packed and (b) the carrier fluid portion of the treating composition separates from the particulate blend and flows into the formation and/or out of the well via, e.g., a casing or tubing annulus. If the treating composition includes a hardenable resin composition, the hardenable resin composition is allowed to harden. After the resin composition hardens, a bore hole can optionally be drilled into the gravel pack in order to further facilitate fluid recovery. Regardless of whether a hardenable resin composition is used and/or a bore hole is drilled into the gravel pack, however, once the gravel pack is in place, fluid recovery is obtained directly through the gravel pack without placing additional devices and/or compositions (e.g., casings, cement, etc.) therein.

In yet another embodiment of the present invention, a treating composition of the type described hereinabove is used in the performance of an otherwise conventional frac-pack procedure. The inventive frac-pack procedure preferably embodies the features of both the inventive fracturing and the inventive gravel packing procedures discussed hereinabove. In the inventive frac-pack procedure, a subterranean formation is preferably initially fractured using a treating composition of the type described hereinabove. The particulate blend component of the treating composition deposits in fractures which are opened and/or enlarged during the fracturing step. After a desired amount of fracturing is achieved, additional particulate blend is tightly packed in the wellbore. The additional particulate blend is preferably packed in the wellbore using a gravel packing procedure of the type described hereinabove. Most preferably, the additional particulate blend is held tightly on the wellbore by (a) packing the additional particulate blend around a gravel packing screen and/or (b) consolidating the particulate blend by means of a resin composition.

In most vertical wells, gravel packing provides a relatively inexpensive and effective means of controlling particulate migration. In horizontal wells, however, the length of the production interval involved will commonly be much larger than the length of a typical vertical production interval. Therefore, the cost of gravel packing a horizontal well will generally be much greater than the cost of gravel packing a typical vertical well. Additionally, due to several factors inherent in nonvertical completions, it is typically difficult to form a gravel pack in a nonvertical well such that the gravel pack surrounds the packing liner in a desirably uniform manner.

These problems have been addressed somewhat by the use of prepacked screening devices (see, e.g., U.S. Pat. No. 4,969,523, the entire disclosure of which is incorporated herein by reference).

In addition to the inventive well treating methods discussed hereinabove, the present invention provides a prepacked screening device which addresses the problems just mentioned and provides fluid flow and particulate migration control properties substantially superior to those provided by the prepacked screening devices heretofore used in the art.

A prepacked screening device 2 provided by the present invention is depicted in the drawing. Device 2 comprises: a pipe or other conduit 4 having perforations 6 extending through the wall thereof around the entire circumference of conduit 4; an inner screen 12 wrapped around the exterior of conduit 4 such that screen 12 covers perforations 6; an outer screen 14 surrounding and spaced apart from inner screen 12; and a gravel pack 16 which fills the void space formed between inner screen 12 and outer screen 14. Device 2 will also preferably include conventional threaded connections 8 and 10 provided on the ends of pipe 4 for connecting apparatus 2 in a tubing string in substantially the same manner that a conventional packed or unpacked screening device is assembled in a tubing string.

Although other suitable screening systems (e.g., perforated tubes) can be used, inner screen 12 and outer screen 14 are preferably permeable wrapped wire screens.

If desired, inner screen 12 can be radially spaced slightly apart from the exterior surface of conduit 4 to thereby provide fluid collection and distribution spaces between screen 12 and conduit 4. The provision of such spacing between inner screen 12 and conduit 4 can be accomplished, for example, by positioning conventional spacer bars 18 between conduit 4 and inner screen 12. Spacer bars 20 can also be positioned between outer screen 14 and gravel pack 16.

The gravel pack 16 employed in inventive device 2 is comprised of a large particulate/small particulate blend of the type described hereinabove. The particulate sizes and concentrations used for forming gravel pack 16 are preferably the same as those used for forming the particulate blend employed in the above-described well treating composition.

Gravel pack 16 can be either an unconsolidated particulate bed or a consolidated particulate bed. Gravel pack 16 is most preferably a particulate blend which has been consolidated using a hardenable resin composition of the type described hereinabove. Although device 2 always preferably includes an inner screening means 12, inner screen 12 can be excluded from device 2 when a consolidated gravel pack 16 is used.

In using inventive device 2, device 2 is preferably connected in a tubing string and then delivered downhole such that device 2 is positioned adjacent a producing formation. Gravel pack 16 provided in device 2 operates to prevent the migration of formation sand and fines into pipe 4. Additional particulate migration control can optionally be obtained by installing a gravel pack around the exterior of device 2. This additional gravel pack is preferably formed around device 2 using an inventive gravel packing procedure as described hereinabove.

The following examples are provided in order to further illustrate the present invention.

EXAMPLE I

Six packed-bed systems consisting of 12/20 mesh resieved Ottawa frac sand and/or 50/70 mesh resieved Ottawa frac sand were prepared for testing. The composition of each of these packed beds is provided in Table 1.

In preparing each of packed beds 1-6, the 12/20 and/or 50/70 mesh material used in forming the bed was first blended with 37.5 milliliters of a gelled aqueous carrier fluid. The gelled aqueous carrier fluid was formed by blending hydroxyethyl cellulose with an aqueous 2% potassium chloride brine solution. The hydroxyethyl cellulose was added to the brine solution in an amount of 40 pounds per 1000 gallons of brine solution.

In each case, the particulate material(s) and the gelled aqueous carrier fluid were blended in a beaker at moderate speed using a stirring guard and an associated stirring blade. Approximately one milliliter of a gel breaker (hemicellulase) was also blended with each composition.

The gelled slurry compositions thus formed were placed in separate teflon chambers. Each teflon chamber had a 100 mesh screen positioned in the bottom thereof. After placing the slurry compositions in the teflon chambers, each composition was lightly tamped with a lucite rod to ensure that the mixture was properly packed and did not include air pockets or void spaces. Each of the packed chambers was then maintained overnight at a temperature of 100° F. Throughout the packing and heating process, a vacuum was applied to the bottom of each teflon chamber.

Each of the packed beds was then flushed with one liter of a filtered aqueous 2% potassium chloride solution. After flushing, the initial permeability of each bed was determined. The initial permeabilities determined for each of test beds 1-6 are provided in Table 2.

To determine whether the gel breaker used was successful in breaking down the gelled carrier liquids employed in forming packed beds 1-6, two additional packed beds were prepared and tested. The first additional packed bed consisted of 100% 50/70 mesh resieved Ottawa frac sand and was prepared using only water as the carrier fluid. The second additional packed bed consisted of 100% 12/20 mesh resieved Ottawa frac sand and was prepared using only water as the carrier fluid. The initial permeabilities of the additional packed beds were essentially the same as the initial permeabilities of the corresponding test beds (i.e., test beds 1 and 6) which contained 100% 50/70 mesh sand and 100% 12/20 mesh sand. Thus, the gel breaker was apparently successful in completely breaking down the gelled carrier used in forming the test beds.

Formation sand migration tests were then conducted through each of test beds 1-6 using an Oklahoma No. 1 sand sample having a particle size distribution consisting of 50.1% by weight of 0.0085-0.0059 inch particles, 29.8% by weight of 0.0059-0.0049 inch particles, 17.7% by weight of 0.0049-0.0041 inch particles, and 2.4% by weight of 0.0041-0.0035 inch particles. The Oklahoma No. 1 sand sample was blended with an aqueous 2% potassium chloride solution to form a sand testing slurry consisting of one gram of sand per 100 milliliters of the 2% KCl solution.

In conducting the sand migration tests, 500 milliliters of sand slurry were pumped through each of the test beds. In each case, near the end of the sand slurry flow period, the fluid pressure just upstream of the packed bed was determined. The effluent flowing through each of the packed beds during the sand migration tests was also collected in order to determine the extent to which sand particles had migrated through the packed bed.

Following the sand migration tests, the permeability of each of test beds 1-6 was again determined using an aqueous 2% potassium chloride solution. As part of the post-permeability test, 4 liters of the potassium chloride solution were pumped through each of the packed beds. The effluent produced from each of the packed beds as a result of the post-permeability test was also collected and examined for the presence of formation sand. The post-permeabilities determined for each of the six test beds are recorded in Table 2. Table 2 also provides the percentage reduction in permeability of each of the test beds produced as a result of the formation sand migration test.

The test results provided in Tables 2 and 3 indicate that the permeabilities and flow conductivities of the test beds containing more than 60% by weight of 12/20 mesh sand substantially exceeded the flow conductivities and permeabilities of the test beds in which the concentration of 12/20 mesh sand was 60% or less. As also indicated in Table 3, the pumping pressures required during the migration flow tests for pumping the dilute sand slurry through the test beds were substantially lower for those test beds containing more than 60% by weight 12/20 mesh sand. Further, the percentage reductions in permeability resulting from the sand migration flow tests for the large particulate/small particulate blend beds are comparable to the percentage permeability reductions observed for the 100% 50/70 mesh test bed.

The test beds consisting of 12/20 mesh and 50/70 mesh sand blends, and particularly test bed 3, also exhibited sand control properties which were equivalent to the sand control properties exhibited by the 100% 50/70 mesh sand bed. No sand was detected in the effluents collected from any of test beds 1-6.

TABLE 1

| COMPOSITIONS OF PACKED BEDS TESTED | | |
|---|---|---|
| Bed No. | 50/70 Mesh Sand (Grams) | 12/20 Mesh Sand (Grams) |
| 1 | 100 | 0 |
| 2 | 40 | 60 |
| 3 | 30 | 70 |
| 4 | 20 | 80 |
| 5 | 10 | 90 |
| 6 | 0 | 100 |

TABLE 2

| TEST BED PERMEABILITIES | | | |
|---|---|---|---|
| Bed No. | Initial Permeability (Darcies) | Post Permeability (Darcies) | Reduction in Permeability Due to Flow Test (%) |
| 1 | 78 | 61 | 22 |
| 2 | 98 | 68 | 29 |
| 3 | 140 | 95 | 31 |
| 4 | 174 | 125 | 29 |
| 5 | 277 | 159 | 42 |
| 6 | 425 | 292 | 31 |

TABLE 3

PUMPING PRESSURE REQUIRED AT END OF FLOW TEST

| Bed No. | Pumping Pressure Required (psi) |
|---|---|
| 1 | 1.67 |
| 2 | 0.71 |
| 3 | 0.38 |
| 4 | 0.51 |
| 5 | 0.52 |
| 6 | 0.55 |

EXAMPLE II

Six consolidated particulate beds (i.e., beds 7–12) consisting of mixtures of 12/20 mesh resieved Ottawa frac sand and 50/70 mesh resieved Ottawa frac sand were prepared. The concentrations of 12/20 mesh sand in consolidated beds 7, 8, 9, 10, 11, and 12 were, respectively, 10% by weight, 30% by weight, 50% by weight, 70% by weight, 80% by weight, and 90% by weight.

In preparing each of the consolidated test beds, 100 grams of the particulate blend in question was blended with a gelled aqueous carrier fluid and an "EPON 828" epoxy resin system (i.e., a resin system containing a diglycidyl ether of bisphenol-A) in a beaker using a stirring guard and blade apparatus. The gelled aqueous carrier fluid consisted of 200 milliliters of an aqueous 2% potassium chloride brine solution and 0.6 milliliters of a surfactant (i.e., a mixture of coco-betaine and ethexylated nonyl phenol). 2.1 milliliters of the epoxy resin system was used for preparing each of consolidated samples 7–12.

After curing, a micrograph analysis was performed for each of consolidated beds 7–12. The micrographs indicated that the large particulate material (i.e., the 12/20 mesh sand) contained in each of beds 7–12 was evenly distributed. At low-weight ratios of large sand to small sand, the small sand appeared dominant. In the bed samples containing 70 weight % or less of the large sand material, the small sand material appeared to encapsulate or surround the large particles. At higher large sand concentrations, the large sand particles were much more likely to be situated in contact with each other.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of stimulating a subterranean formation comprising the step of injecting a fracturing composition into said subterranean formation, wherein: said fracturing composition comprises a carrier fluid and a proppant blend; said proppant blend consists essentially of a large proppant material and a small proppant material; said large proppant material consists essentially of particles smaller than about 4 mesh but not smaller than about 40 mesh; said small proppant material consists essentially of particles smaller than about 16 mesh but not smaller than about 100 mesh; substantially all of the particles of said small proppant material are smaller than substantially all of the particles of said large proppant material; said small proppant material is present in said proppant blend in an amount in the range of from about 5% to about 60% by weight based on the amount of said large proppant material present in said proppant blend; said proppant blend has been formed by admixing one of said proppant materials with the other of the said proppant materials; and said fracturing fluid is injected into said subterranean formation in said step of injecting such that said fracturing fluid forms a fracture in said subterranean formation and said proppant blend is deposited in said fracture to thus provide a fluid permeable region within said subterranean formation.

2. The method of claim 1 wherein said amount of said small proppant material present in said fracturing composition does not substantially exceed the bulk void volume of said large proppant material.

3. The method of claim 1 wherein said amount of said small proppant material present in said proppant blend is an amount in the range of from about 25% to about 35% by weight based on the amount of said large proppant material present in said proppant blend.

4. The method of claim 1 wherein:
said fracturing composition includes an effective amount of a hardenable resin composition for consolidating said proppant blend to form a hard permeable mass and
said method further comprises the step of allowing said resin composition to harden such that said proppant blend is consolidated in said fracture.

5. The method of claim 1 wherein:
said large proppant material has a particle size of 4/8 mesh and
said small proppant material has a particle size of 16/30 mesh or 20/40 mesh.

6. The method of claim 1 wherein:
said large proppant material has a particle size distribution of 8/12 mesh and
said small proppant material has a particle size distribution of 30/50 mesh or 40/60 mesh.

7. The method of claim 1 wherein:
said large proppant material has a particle size distribution of 12/20 mesh and
said small proppant material has a particle size distribution of 50/70 mesh or 40/60 mesh.

8. The method of claim 1 wherein:
said large proppant material has a particle size distribution of 20/40 mesh and
said small proppant material has a particle size distribution of 50/70 mesh or 60/80 mesh.

9. A method of stimulating a subterranean formation comprising the steps of:
(a) applying a first fluid to said formation such that a fracture is formed therein and
(b) injecting a treating composition into said fracture, wherein: said treating composition comprises a carrier fluid and a particulate blend; said particulate blend consists essentially of a large particulate material and a small particulate material; said large particulate material consists essentially of particles smaller than about 4 mesh but not smaller than about 40 mesh; said small particulate material consists essentially of particles smaller than about 16 mesh but not smaller than about 100 mesh; substantially all of the particles of said small particulate material are smaller than substantially all of the particles of said large particulate material; said small particulate material is present in said particulate blend in an amount in the range of from about 5% to about 60% by weight based on the amount of said larger particulate material present in said particulate blend; said particulate blend has been formed by admixing one of said particulate materials with the other of said particulate materials; and said treating composition is injected into said fracture in step (b) such that said particulate blend is deposited in said fracture to thus provide a fluid permeable region within said subterranean formation.

10. The method of claim 9 wherein said amount of said small particulate material present in said particulate blend does not substantially exceed the bulk void volume of said large particulate material.

11. The method of claim 9 wherein said amount of said small particulate material present in said particulate blend is an amount in the range of from about 25% to about 35% by weight based on the amount of said large particulate material present in said particulate blend.

12. The method of claim 9 wherein:
said treating composition includes an effective amount of a hardenable resin composition for consolidating said particulate blend to form a hard permeable mass and
said method further comprises the step of allowing said resin composition to harden such that said particulate blend is consolidated in said fracture.

13. The method of claim 9 wherein said first fluid is a viscous liquid.

14. The method of claim 9 wherein said treating composition further comprises a gas.

15. The method of claim 9 wherein said first fluid comprises a compressible fluid.

16. The method of claim 9 wherein:
said large particulate material has a particle size distribution of 4/8 mesh and
said small particulate material has a particle size distribution of 16/30 mesh or 20/40 mesh.

17. The method of claim 9 wherein:
said large particulate material has a particle size distribution of 8/12 mesh and
said small particulate material has a particle size distribution of 30/50 mesh or 40/60 mesh.

18. The method of claim 9 wherein:
said large particulate material has a particle size distribution of 12/20 mesh and
said small particulate material has a particle size distribution of 50/70 mesh or 40/60 mesh.

19. The method of claim 9 wherein:
said large particulate material has a particle size distribution of 20/40 mesh and
said small particulate material has a particle size distribution of 50/70 mesh or 60/80 mesh.

* * * * *